US006882626B1

(12) United States Patent
Marathe et al.

(10) Patent No.: US 6,882,626 B1
(45) Date of Patent: Apr. 19, 2005

(54) SYSTEM AND METHOD FOR AUTOMATED SWITCHING OF DATA TRAFFIC IN A PACKET NETWORK

(75) Inventors: Madhav V. Marathe, Cupertino, CA (US); Ronak Desai, Fremont, CA (US); Madhu Grandhi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 691 days.

(21) Appl. No.: 09/586,662

(22) Filed: Jun. 1, 2000

(51) Int. Cl.[7] .............................................. H04L 12/26
(52) U.S. Cl. ..................................... 370/241.1; 370/228
(58) Field of Search ................................ 370/216, 217, 370/218, 225, 226, 227, 228, 241, 241.1, 395.1, 395.52; 714/2, 39, 48

(56) References Cited

U.S. PATENT DOCUMENTS

| | | |
|---|---|---|
| 4,455,644 A | 6/1984 | Fox et al. |
| 4,471,480 A | 9/1984 | Haussmann et al. |
| 4,633,246 A | 12/1986 | Jones et al. |
| 4,841,560 A | 6/1989 | Chan et al. |
| 5,278,977 A | 1/1994 | Spencer et al. |
| 5,337,307 A | 8/1994 | Sato et al. |
| 5,598,403 A | 1/1997 | Tatsuki |
| 5,634,097 A | 5/1997 | Ashi et al. |
| 5,646,936 A | 7/1997 | Shah et al. |
| 5,648,965 A | 7/1997 | Thadani et al. |
| 5,659,540 A | 8/1997 | Chen et al. |
| 5,671,215 A | 9/1997 | Foglar |
| 5,710,760 A | 1/1998 | Moll |
| 5,781,528 A | 7/1998 | Sato et al. |
| 5,812,528 A | 9/1998 | VanDervort |
| 5,848,055 A | 12/1998 | Fedyk et al. |
| 5,864,555 A | 1/1999 | Mathur et al. |
| 5,872,770 A | 2/1999 | Park et al. |
| 5,898,669 A | 4/1999 | Shimony et al. |
| 5,901,141 A | 5/1999 | Gruber et al. |
| 5,926,456 A | 7/1999 | Takano et al. |
| 6,011,780 A | 1/2000 | Vaman et al. |
| 6,023,452 A | 2/2000 | Shiragaki |
| 6,023,455 A | 2/2000 | Takahashi |
| 6,026,077 A | 2/2000 | Iwata |
| 6,049,542 A | 4/2000 | Prasad |
| 6,222,820 B1 * | 4/2001 | Hamami ..................... 370/218 |
| 6,272,107 B1 | 8/2001 | Rochberger et al. |
| 6,304,549 B1 | 10/2001 | Srinivasan et al. |
| 6,311,288 B1 | 10/2001 | Heeren et al. |
| 6,377,548 B1 | 4/2002 | Chuah |
| 6,377,574 B1 * | 4/2002 | Endo ......................... 370/359 |
| 6,424,629 B1 * | 7/2002 | Rubino et al. ........... 370/241.1 |
| 6,430,153 B1 | 8/2002 | Hughes et al. |
| 6,442,132 B1 | 8/2002 | Burns et al. |
| 6,526,060 B1 | 2/2003 | Hughes et al. |
| 6,636,484 B1 | 10/2003 | Agrawal et al. |
| 6,643,254 B1 | 11/2003 | Kajitani et al. |
| 6,654,342 B1 | 11/2003 | Dittia et al. |
| 6,657,970 B1 | 12/2003 | Buckingham et al. |
| 6,661,773 B1 | 12/2003 | Pelissier et al. |

OTHER PUBLICATIONS

Phillips, Robert. "ATM/IP in the 21st Century". IEEE. Oct. 22, 1998–Oct. 24, 1998. pp. 1–5.*
Chen et al. "Monitoring and Control of ATM Networks Using Special Cells". IEEE. Oct. 1996. pp. 28–38.*
International Telecommunication Union (ITU). ITU–T, I.630. Series 1: Integrated Services Digital Network; Maintenance principles: ATM protection switching (Feb. 1999).

* cited by examiner

Primary Examiner—Chi Pham
Assistant Examiner—Derrick W Ferris
(74) Attorney, Agent, or Firm—Blakely, Sokoloff, Taylor & Zafman LLP (57) ABSTRACT

A system and method for automated switching of data traffic in a network are described. Data is transmitted along a first virtual circuit among multiple virtual circuits in a network. Next, a failure is detected on the first virtual circuit. As a result, transmission of data is switched from the first virtual circuit to a second virtual circuit among the multiple virtual circuits in the network.

50 Claims, 6 Drawing Sheets

SYSTEM AND METHOD FOR AUTOMATED SWITCHING OF DATA TRAFFIC IN A PACKET NETWORK

FIELD OF THE INVENTION

The present invention relates generally to telecommunication systems and, more particularly, to a system and method for automated switching of data traffic in a packet network.

BACKGROUND OF THE INVENTION

ATM is a switching and multiplexing technique designed for transmitting digital information, such as data, video, and voice, at high speed, with low delay, over a telecommunications network. The ATM network includes a number of switching nodes coupled through communication links. In the ATM network, bandwidth capacity is allocated to fixed-sized units named "cells." The communication links transport the cells from a switching node to another. These communication links can support many virtual connections, also named channels, between the switching nodes. The virtual connections, for example a Virtual Channel Connection (VCC) or a Permanent Virtual Circuit (PVC), assure the flow and delivery of information contained in the cells.

The ATM Forum, which is a user and vendor group establishing ATM standards, has also defined several ATM service categories, used in characterization of a virtual connection. For example, among such service categories are (1) a Constant Bit Rate (CBR), which supports a constant or guaranteed rate to transport services, such as video or voice, as well as circuit emulation, which requires rigorous timing control and performance parameters; (2) a Variable Bit Rate (VBR), real time and non real time, which supports variable bit rate data traffic with average and peak traffic parameters; (3) an Available Bit Rate (ABR), which supports feedback to control the source rate in response to changed characteristics in the network; and (4) an Unspecified Bit Rate (UBR).

Figure 1A:
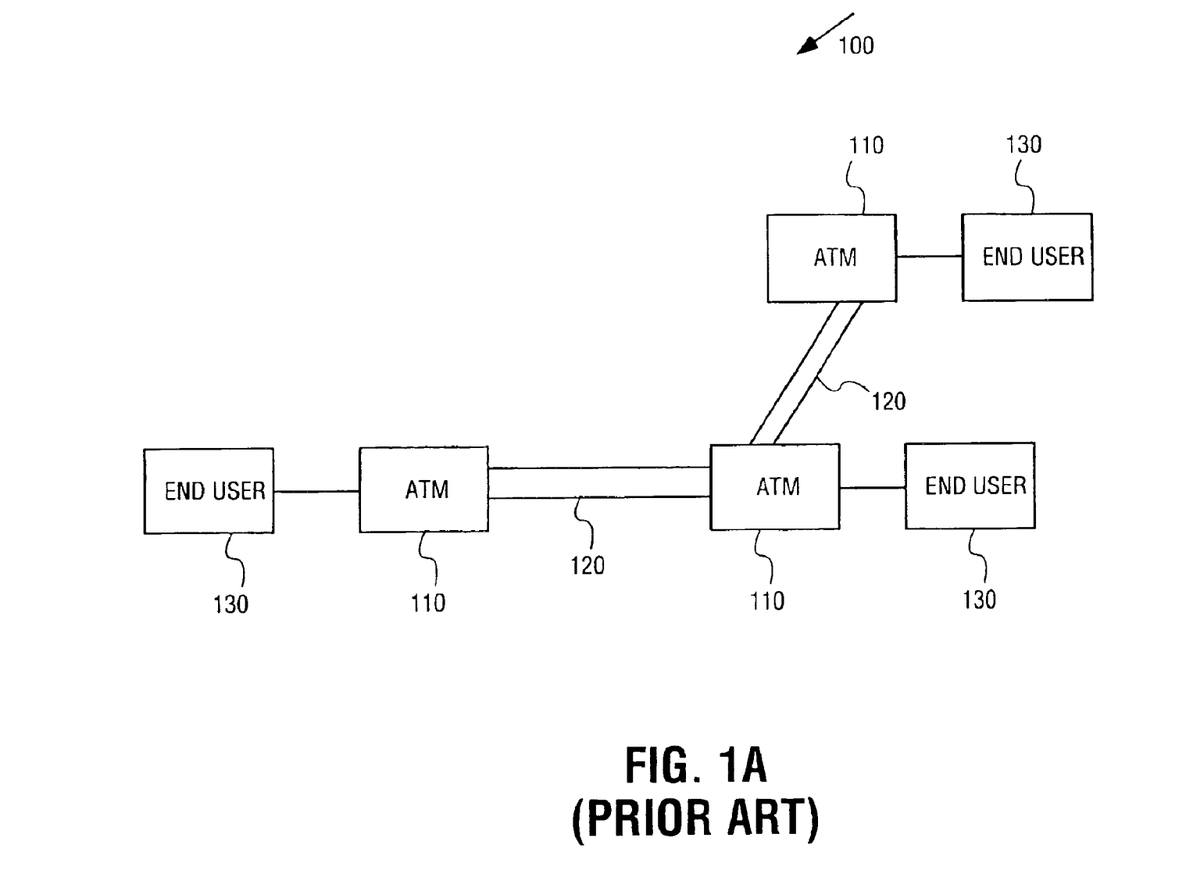
FIG. 1a shows an exemplary connection-oriented network.

FIG. 1a illustrates a prior art packet network 100, typically including several network nodes, also known as switching nodes, 110 connected through single communication links 120. The packet network 100 is a data transmission network with guaranteed bandwidth and quality of service. Typically, end users 130 access the network 100 and connect to the nodes 110 via similar links 120. Generally, the illustrated communication links 120 carry traffic from many sources to many destinations and may support multiple virtual connections. Although these virtual connections may be statistically multiplexed onto the same link, the network 100 must still meet certain quality of service requirements for each connection.

A failure within the network 100 will interrupt the flow of data from a source end user to a destination end user. When the flow of data is interrupted for a longer period of time, typically for a period longer than 250 milliseconds, some voice communications, such as voice calls, carried by the network will be dropped. In order to improve the reliability of networks, several systems have been designed to eliminate such extended data interruptions.

Figure 1B:
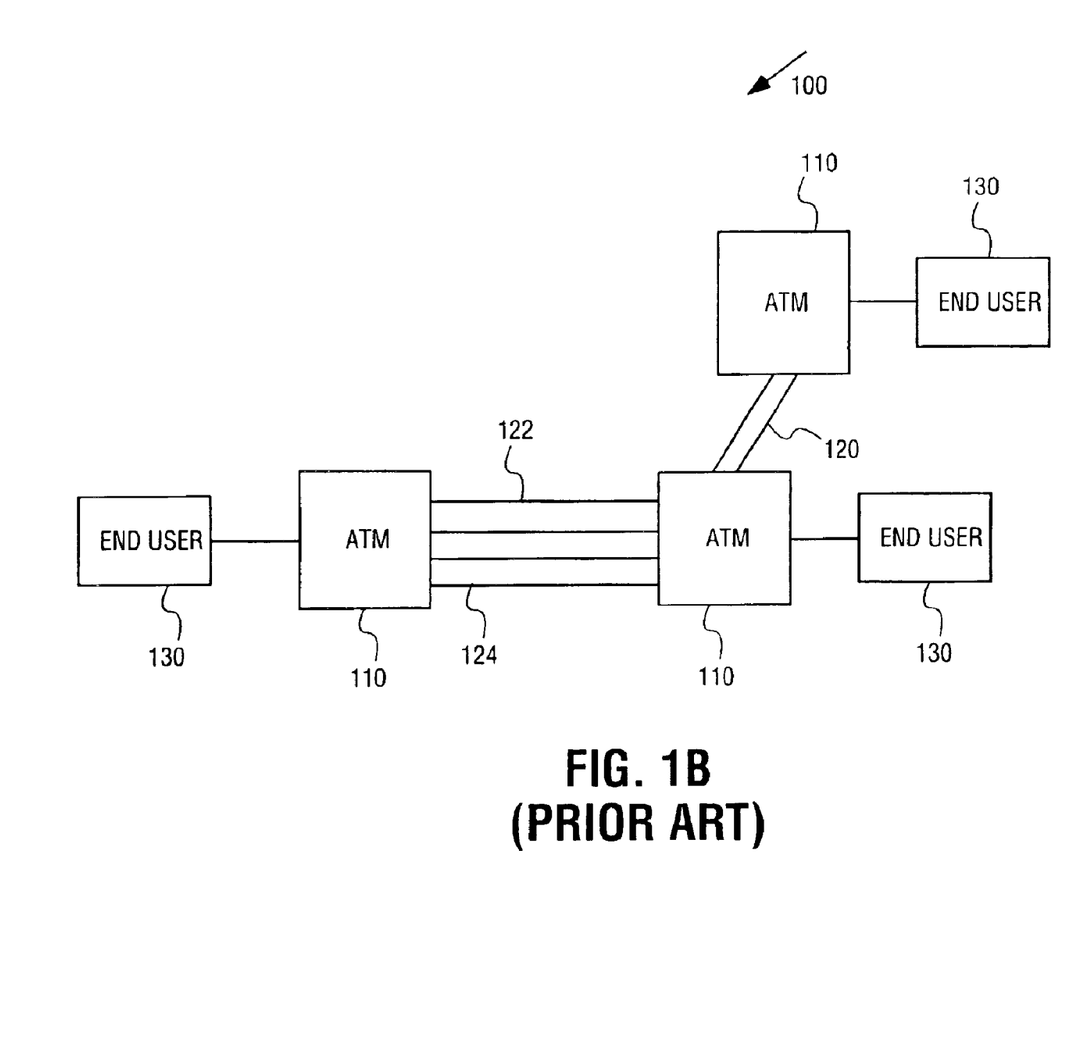
FIG. 1b shows an exemplary connection-oriented network with an example of an Automatic Protection Switching (APS) system.

One such system is an automatic protection switching (APS) system. As illustrated in FIG. 1b, in the packet network 100, parallel links 122, 124 connect the nodes 110 and are used to transmit duplicate information between the nodes 110 and to ensure fast and reliable data transmission. Link 122 is called an "active" link, while link 124 is a "stand-by" link. Because the same information is transmitted on both links 122, 124, the switching node 110 located at the receiving end can choose either link to receive the transmitted information. For example, if the active link 122 fails, the stand-by link 124 can deliver the same information to the switching node. This APS configuration can be implemented, for example, with the SONET/SDH standards, and can also be used to transport data packets instead of voice communications.

Although the APS system addresses link failures and can switch to a redundant link within 250 milliseconds, it cannot solve a network failure across multiple nodes, unless the network is covered with the APS system, which could be very expensive. Also, although the APS system increases the reliability of packet networks, the duplicated data sent on both links 122, 124 reduces the bandwidth in half, resulting in a waste of bandwidth.

SUMMARY OF THE INVENTION

A system and method for automated switching of data traffic in a network are described. Data is transmitted along a first virtual circuit among multiple virtual circuits in the network. Next, a failure is detected on the first virtual circuit. As a result, transmission of data is switched from the first virtual circuit to a second virtual circuit among the multiple virtual circuits in the network.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

According to embodiments described herein, a gateway module within an ATM switch transmits data along a first virtual circuit among multiple virtual circuits in a packet network. Next, a line card within the gateway module detects a failure on the first virtual circuit. As a result, the line card switches transmission of data from the first virtual circuit to a second virtual circuit among the multiple virtual circuits in the network, thereby increasing the reliability of the network. One intended advantage is the reduction of the network failure time and the associated traffic loss. Another intended advantage is the implementation of the redundancy in the ATM layer of the network, which contains the ATM switch, without any involvement from the Internet Protocol (IP) layer, which contains routers receiving data.

Figure 2:
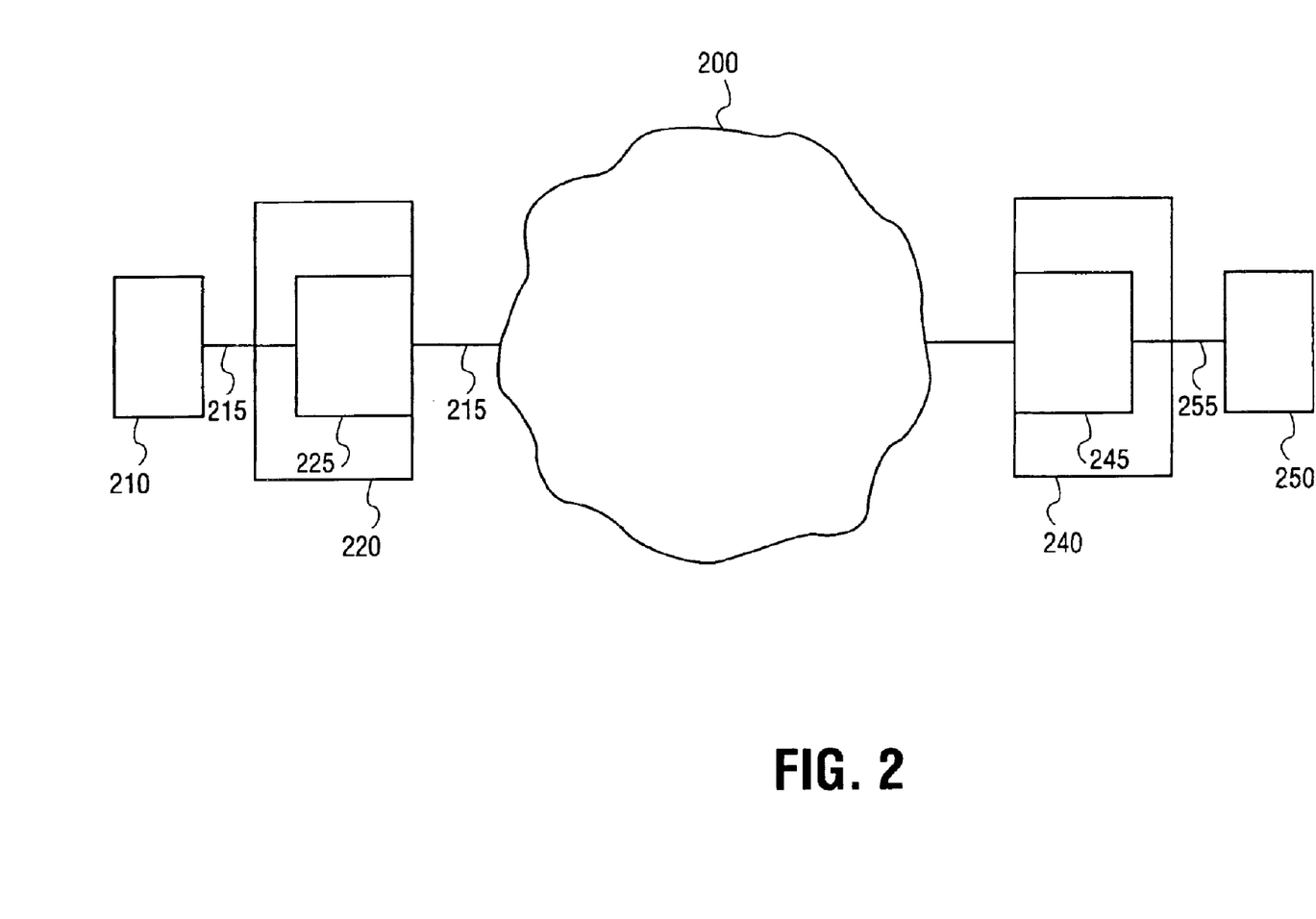
FIG. 2 shows an exemplary packet network for handling voice communications.

FIG. 2 shows an exemplary connection-oriented network for handling voice communications, such as voice calls. As shown in FIG. 2, in one embodiment, an end user 210, trying to initiate a voice call directed to a second end user 250, transmits a sequence of bits along link 215 to a network 200 via a transmitting first gateway module 220. The transmitting gateway module 220 includes a line card 225 connected to the network. In one embodiment, line card 225 is a Voice Interworking Service Module (VISM) card, available from Cisco Systems, Inc., of San Jose, Calif. In one embodiment, the sequence of bits is transmitted at a standard rate into gateway module 220, is received by the line card 225, and translated into packets or cells.

Referring again to FIG. 2, the data packets are then sent through the network 200 and reach a receiving second gateway module 240, prior to being delivered to the second user 250. The receiving gateway module 240 also includes a line card 245 connected to the network 200. In one embodiment, line card 225 is a VISM card, available from Cisco Systems, Inc., of San Jose, Calif. Once received within line card 245 of gateway module 240, the packets are decoded and translated back into sequence of bits, which are then transmitted to user 250 along link 255. The system for improving reliability of the network 200 will now be described in further detail.

Figure 3:
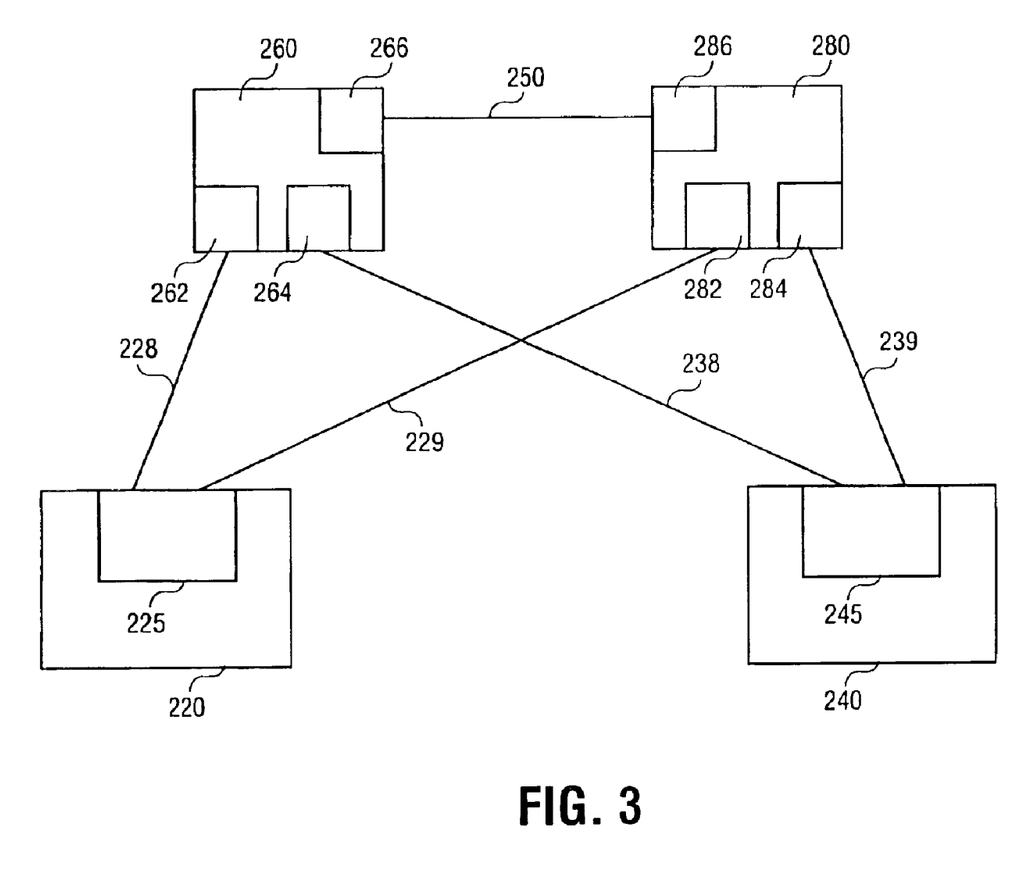
FIG. 3 shows one embodiment of the system for automated switching of data traffic.

FIG. 3 shows one embodiment of the system for automated switching of data traffic in a packet network. In one embodiment, the packet network is an Internet Protocol (IP) network. As illustrated in FIG. 3, line card 225 within gateway module 220 is connected to line card 245 within gateway module 240 through routers 260 and 280 provided within network 200. In one embodiment, routers 260 and 280 are high-speed routers residing within the IP network 200. Router 260 further includes ATM interfaces 262 and 264 and router interface 266. Router 280 further includes ATM interfaces 282 and 284 and router interface 286. The router interface 266 of router 260 is further connected to the router interface 286 of router 280 through a communication link 250. In one embodiment, communication link 250 is a Packet over SONET link, having fully redundant APS protection.

Line card 225 within gateway module 220 is connected to ATM interface 262 of router 260 through a link supporting ATM virtual circuit 228. Line card 225 is further connected to ATM interface 282 of router 280 through a link supporting ATM virtual circuit 229. Line card 245 within gateway module 240 is connected to ATM interface 264 of router 260 through a link supporting ATM virtual circuit 238 and is further connected to ATM interface 284 of router 280 through a link supporting ATM virtual circuit 239. ATM virtual circuits 228, 229, 238, 239, can support multiple voice connections between gateway modules 220 and 240. Each ATM virtual circuit 228, 229, 238, 239 is provisioned with a predetermined bandwidth, sufficient to support all connections established by gateway modules 220 and 240.

In one embodiment, if a voice connection is established between gateway modules 220 and 240, line card 225 transmits data packets along virtual circuit 228 to router 260. Router 260 receives the data packets through ATM interface 262 and transmits data to line card 245 along ATM virtual circuit 238 using the ATM interface 264. At the same time, line card 245 transmits data packets along virtual circuit 238 to router 260, which routes the data packets to line card 225 along virtual circuit 228. Alternatively, line card 225 may establish a connection along virtual circuit 229, through router 280, and transmit the data packets to line card 245. In yet another embodiment, line card 225 may send data packets along both virtual circuits 228 and 229.

In one embodiment, at the same time with the transmission of data packets along virtual circuit 228, line card 225 transmits detecting cells, for example Operation and Management (OAM) loopback cells, at a predetermined frequency along both virtual circuits 228 and 229. Each OAM loopback cell includes a special correlation tag to router with active loop back indication. As a result, virtual circuit 228 carries data packets and OAM loopback cells, while virtual circuit 229 only carries OAM loopback cells at the predetermined frequency.

Line card 225 within gateway module 220 monitors the virtual circuit 228 and receives the OAM loopback cells at the predetermined frequency. If a failure is declared on the link supporting virtual circuit 228, the connection which allows the flow of data packets and OAM loopback cells along virtual circuit 228 is affected and line card 225 stops receiving the OAM loopback cells at the predetermined frequency.

In one embodiment, if line card 225 detects a predetermined gap in the receipt of OAM loopback cells along virtual circuit 228, it declares the failure, and switches transmission of data packets along virtual circuit 229. In one embodiment, line card 225 detects a gap of three consecutive OAM loopback cells. Alternatively, another number of consecutive OAM loopback cells may be provisioned to signal the failure in transmission of data.

Once data packets are switched to the connection established along virtual circuit 229, data travels to router 280 through ATM interface 282. Router 280 then routes the flow of data packets via ATM interface 284 and along virtual circuit 239 to line card 245.

Even if line card 245 now receives data packets along virtual circuit 239, line card 245 is not aware of the failure declared along virtual circuit 228 and continues to send data along virtual circuit 238 to router 260. Since router 260 receives no data along virtual circuit 228 and has detected the failure by a predetermined procedure, for example transmission of OAM loopback cells from router 260 to line card 225, it cannot send data along virtual circuit 228. As a result, router 260 forwards the data packets received from line card 245 to router 280 along IP link 250. Router 280 receives the data packets through interface 286 and routes the data packets to line card 225 along virtual circuit 229.

Figure 4:
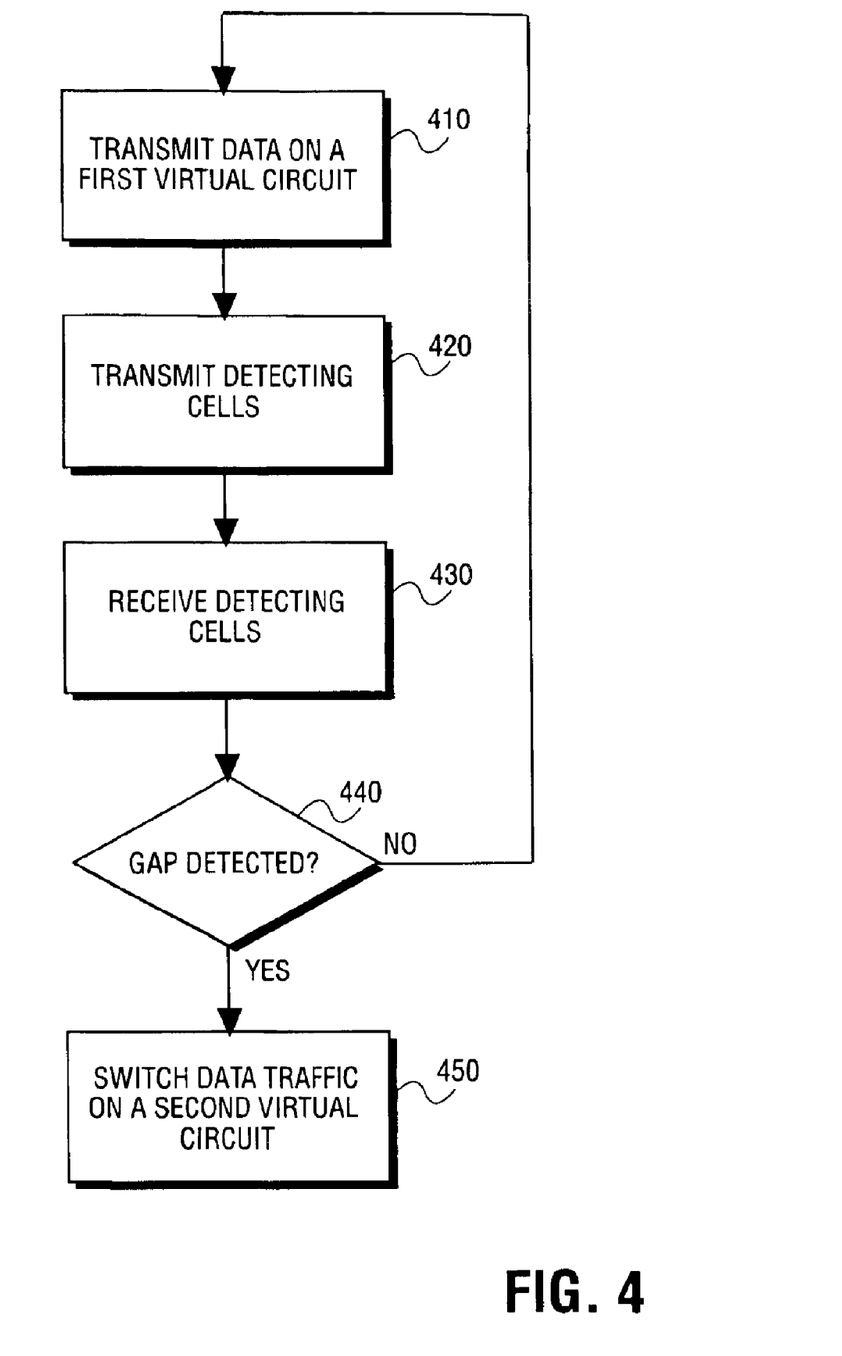
FIG. 4 is a flow diagram representing detection of a failure in the system for automated switching of data traffic.

FIG. 4 is a flow diagram representing detection of a failure in the system for automated switching of data traffic. At processing block 410, data is transmitted on a first virtual circuit in the packet network. At processing block 420, detecting cells are transmitted at a predetermined frequency on the first virtual circuit and a second virtual circuit in the packet network. In one embodiment, the detecting cells are OAM loopback cells having a correlation tag with incrementing sequence number.

At processing block 430, the detecting cells are received along the first and the second virtual circuit. At processing block 440, a decision is made whether a predetermined gap is detected in receipt of the detecting cells. In one embodiment, the predetermined gap contains three consecutive detecting cells.

If the gap is detected, then, at processing block 450, data transmission is switched on to the second virtual circuit. Otherwise, if no gap is detected, processing blocks 410 through 440 are repeated.

Referring back to FIG. 3, after transmission of data packets is switched to virtual circuit 229, line card 225 continues to monitor virtual circuits 228 and 229 by sending OAM loopback cells at the predetermined frequency along both virtual circuits 228 and 229. Line card 225 detects that virtual circuit 228 is back up and that the failure has been remedied once it receives a predetermined sequence of OAM loopback cells along virtual circuit 228. In one embodiment, the predetermined sequence contains five consecutive OAM loopback cells. Alternatively, a different number of consecutive OAM loopback cells may be provided to signal that the failure has been remedied.

In one embodiment, line card 225 continues to send data packets along virtual circuit 229 and OAM loopback cells along both virtual circuits 228 and 229. Alternatively, line card 225 may be provisioned to switch transmission of data packets back to virtual circuit 228.

Figure 5:
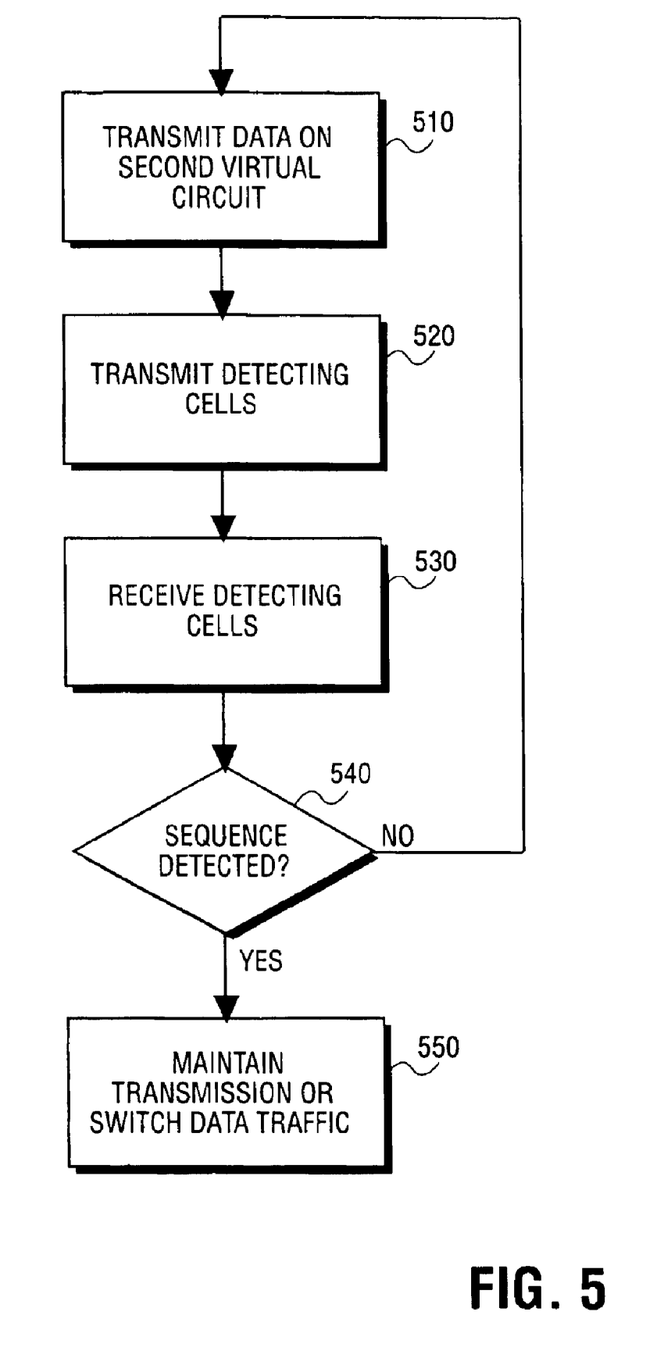
FIG. 5 is a flow diagram representing detection of a remedied failure in the system for automated switching of data traffic.

FIG. 5 is a flow diagram representing detection of a remedied failure in the system for automated switching of data traffic. At processing block 510, data is transmitted on the second virtual circuit. At processing block 520, detecting cells are transmitted at a predetermined frequency on the first virtual circuit and the second virtual circuit in the packet network. In one embodiment, the detecting cells are OAM loopback cells having the correlation tag with incrementing sequence number.

At processing block 530, the detecting cells are received along the first and the second virtual circuit. At processing block 540, a decision is made whether a predetermined sequence is detected in receipt of the detecting cells. In one embodiment, the predetermined sequence contains five consecutive detecting cells.

If the sequence is detected, then, at processing block 550, in one embodiment, data transmission is maintained on the second virtual circuit. Alternatively, data transmission may be switched to the first virtual circuit. If no sequence is detected, processing blocks 510 through 540 are repeated.

In one embodiment, the following discussion is presented in the context of a Voice over packet network, such as an Internet Protocol (IP) network. However, the present invention is not limited to IP networks and may be implemented with other types of networks, such as Frame Relay networks running on Asynchronous Transfer Mode (ATM) networks, and any protocol which can run over an ATM network. The present invention may be implemented with different types of communication paths or virtual circuits, such as Permanent Virtual Circuits (PVCs), Switched Virtual Circuits (SVCs), or a combination of PVCs and SVCs.

It is also to be understood that embodiments of this invention may be used as or to support software programs executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:

transmitting data to a first router from a first gateway module along a first virtual circuit of a plurality of virtual circuits in a network and a plurality of detecting cells to the first router from the first gateway module along said first virtual circuit and to a second router from the first gateway module along a second virtual circuit of said plurality of virtual circuits;

detecting a failure on said first virtual circuit using a switch; and switching transmission of said data from said first virtual circuit to a second virtual circuit of said plurality of virtual circuits in said network.

2. The method according to claim 1, wherein said network is an Internet Protocol (IP) network.

3. The method according to claim 1, wherein said network is an Asynchronous Transfer Mode (ATM) network.

4. The method according to claim 3, wherein said data comprises Asynchronous Transfer Mode (ATM) cells.

5. The method according to claim 1, wherein said plurality of detecting cells are transmitted at a predetermined frequency.

6. The method according to claim 1, wherein each detecting cell of said plurality of detecting cells is an operation and management (OAM) loopback cell having a correlation tag with incrementing sequence number.

7. The method according to claim 1, wherein said detecting further comprises:

receiving said plurality of detecting cells; and detecting a predetermined gap in said plurality of detecting cells on said first virtual circuit.

8. The method according to claim 1, wherein said predetermined gap includes three detecting cells of said plurality of detecting cells.

9. The method according to claim 7, further comprising:

detecting a predetermined sequence of detecting cells of said plurality of detecting cells on said first virtual circuit; and switching transmission of said data from said second virtual circuit to said first virtual circuit.

10. The method according to claim 9, wherein said predetermined sequence includes five detecting cells of said plurality of detecting cells.

11. The method according to claim 1, further comprising transmitting the plurality of detecting cells along each virtual circuit of said plurality of virtual circuits.

12. The method according to claim 7, further comprises:

detecting a predetermined sequence of detecting cells of said plurality of detecting cells on said first virtual circuit; and maintaining transmission of said data along said second virtual circuit.

13. The method of claim 1, wherein switching transmissions of said data further comprises:

transmitting the data to the second router along a communication link upon detecting the failure on said first virtual circuit using the switch; and transmitting the data to the first gateway module from the second router along the second virtual circuit.

14. The method of claim 1, further comprising:

receiving data from a second gateway module by the first router along a third virtual circuit of the plurality of virtual circuits in the network;

receiving the plurality of detecting cells from the second gateway module by the first router along the third virtual circuit; and transmitting the plurality of detecting cells to the first gateway module from the first router along the first virtual circuit.

15. The method of claim 14, further comprising transmitting the data to the first gateway module from the first router along the first virtual circuit when the switch does not detect the failure on the first virtual circuit.

16. The method of claim 14, wherein switching transmissions of said data further comprises:
   transmitting the data to the second router along a communication link upon detecting the failure on said first virtual circuit using the switch; and
   transmitting the data to the first gateway module from the second router along the second virtual circuit.

17. A switch comprising:
   a gateway module to transmit data to a first router along a first virtual circuit of a plurality of virtual circuits in a network;
   said gateway module further including a line card to detect a failure on said first virtual circuit and switching transmission of said data to the first router along said first virtual circuit to a second router along a second virtual circuit of said plurality of virtual circuits, wherein said gateway module further transmits a plurality of detecting cells along said first virtual circuit to the first router from the gateway module and said second virtual circuit to the second router from the gateway module.

18. The switch according to claim 17, wherein said plurality of detecting cells are transmitted at a predetermined frequency.

19. The switch according to claim 17, wherein each detecting cell of said plurality of detecting cells is an operation and management (OAM) loopback cell having a correlation tag with incrementing sequence number.

20. The switch according to claim 17, wherein said line card further receives said plurality of detecting cells and detects a predetermined gap in said plurality of detecting cells on said first virtual circuit.

21. The switch according to claim 20, wherein said predetermined gap includes three detecting cells of said plurality of detecting cells.

22. The switch according to claim 17, wherein said line card further receives said plurality of detecting cells and detects a predetermined sequence of detecting cells of said plurality of detecting cells on said first virtual circuit.

23. The switch according to claim 22, herein said line card further switches transmission of said data from said second virtual circuit to said first virtual circuit.

24. The switch according to claim 22, wherein said line card further maintains transmission of said data along said second virtual circuit.

25. The switch according to claim 22, wherein said predetermined sequence includes five detecting cells of said plurality of detecting cells.

26. The switch according to claim 17, wherein said data comprises Asynchronous Transfer Mode (ATM) cells.

27. A computer readable medium containing executable instructions which, when executed in a processing system, cause the system to perform a method comprising:
   transmitting data to a first router from a gateway module along a first virtual circuit of a plurality of virtual circuits in a network and a plurality of detecting cells to the first router from the gateway module along said first virtual circuit and to a second router from the gateway module along a second virtual circuit of said plurality of virtual circuits;
   detecting a failure on said first virtual circuit by a switch comprising the computer readable medium; and
   switching transmission of said data from said first virtual circuit to a second virtual circuit of said plurality of virtual circuits in said network.

28. The computer readable medium according to claim 27, wherein said network is an Internet Protocol (IP) network.

29. The computer readable medium according to claim 27, wherein said network is an Asynchronous Transfer Mode (ATM) network.

30. The computer readable medium according to claim 29, wherein said data comprises Asynchronous Transfer Mode (ATM) cells.

31. The computer readable medium according to claim 27, wherein said plurality of detecting cells are transmitted at a predetermined frequency.

32. The computer readable medium according to claim 27, wherein each detecting cell of said plurality of detecting cells is an operation and management (DAM) loopback cell having a correlation tag with incrementing sequence number.

33. The computer readable medium according to claim 27, wherein said detecting further comprises:
   receiving said plurality of detecting cells; and
   detecting a predetermined gap in said plurality of detecting cells on said first virtual circuit.

34. The computer readable medium according to claim 33, wherein said predetermined gap includes three detecting cells of said plurality of detecting cells.

35. The computer readable medium according to claim 33, wherein said method further comprises:
   detecting a predetermined sequence of detecting cells of said plurality of detecting cells on said first virtual circuit; and
   switching transmission of said data from said second virtual circuit to said first virtual circuit.

36. The computer readable medium according to claim 35, wherein said predetermined sequence includes five detecting cells of said plurality of detecting cells.

37. The computer readable medium according to claim 27, wherein said method further comprises transmitting the plurality of detecting cells along each virtual circuit of said plurality of virtual circuits.

38. The computer readable medium according to claim 33, wherein said method further comprises:
   detecting a predetermined sequence of detecting cells of said plurality of detecting cells on said first virtual circuit; and
   maintaining transmission of said data along said second virtual circuit.

39. An apparatus comprising:
   means for transmitting data to a first router from a gateway module along a first virtual circuit of a plurality of virtual circuits in a network and a plurality of detecting cells to the first router from the gateway module along said first virtual circuit and to a second router from the gateway module along a second virtual circuit of said plurality of virtual circuits;
   means for detecting a failure on said first virtual circuit using a switch; and
   means for switching transmission of said data from said first virtual circuit to a second virtual circuit of said plurality of virtual circuits in said network.

40. The apparatus according to claim 39, wherein said network is an Internet Protocol (IP) network.

41. The apparatus according to claim 39, wherein said network is an Asynchronous Transfer Mode (ATM) network.

42. The apparatus according to claim 41, wherein said data comprises Asynchronous Transfer Mode (ATM) cells.

43. The apparatus according to claim 39, wherein said plurality of detecting cells are transmitted at a predetermined frequency.

44. The apparatus according to claim 39, wherein each detecting cell of said plurality of detecting cells is an operation and management (OAM) loopback cell having a correlation tag with incrementing sequence number.

45. The apparatus according to claim 39, further comprising:

means for receiving said plurality of detecting cells; and     means for detecting a predetermined gap in said plurality of detecting cells on said first virtual circuit.

46. The apparatus according to claim 45, wherein said predetermined gap includes three detecting cells of said plurality of detecting cells.

47. The apparatus according to claim 45, further comprising:

means for detecting a predetermined sequence of detecting cells of said plurality of detecting cells on said first virtual circuit; and     means for switching transmission of said data from said second virtual circuit to said first virtual circuit.

48. The apparatus according to claim 47, wherein said predetermined sequence includes five detecting cells of said plurality of detecting cells.

49. The apparatus according to claim 45, further comprises:

means for detecting a predetermined sequence of detecting cells of said plurality of detecting cells on said first virtual circuit; and     means for maintaining transmission of said data along said second virtual circuit.

50. The apparatus according to claim 39, further comprising means for transmitting the plurality of detecting cells along each virtual circuit of said plurality of virtual circuits.

* * * * *